(12) United States Patent  
Discenzo

(10) Patent No.: US 7,538,512 B2  
(45) Date of Patent: May 26, 2009

(54) INTEGRATED CONTROL AND DIAGNOSTICS SYSTEMS

(75) Inventor: Frederick M. Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/933,256

(22) Filed: Oct. 31, 2007

(65) Prior Publication Data

US 2008/0048603 A1 Feb. 28, 2008

Related U.S. Application Data

(63) Continuation of application No. 10/654,776, filed on Sep. 4, 2003, now Pat. No. 7,301,296, which is a continuation of application No. 09/911,130, filed on Jul. 23, 2001, now Pat. No. 6,646,397, which is a continuation of application No. 09/461,787, filed on Dec. 15, 1999, now Pat. No. 6,326,758.

(51) Int. Cl.  
*G05B 11/36* (2006.01)

(52) U.S. Cl. ........................ 318/609; 318/610

(58) Field of Classification Search ................ 318/609, 318/610, 632, 432, 434, 600  
See application file for complete search history.

(56) References Cited

U.S. PATENT DOCUMENTS

| | | |
|---|---|---|
| 5,086,260 A | 2/1992 | Ito |
| 5,105,135 A | 4/1992 | Nashiki et al. |
| 5,166,592 A | 11/1992 | Bashark |
| 5,220,259 A | 6/1993 | Werner et al. |
| 5,220,264 A * | 6/1993 | Yamada ............... 318/599 |
| 5,325,460 A * | 6/1994 | Yamada et al. ........ 388/811 |
| 5,337,013 A | 8/1994 | Langer et al. |
| 5,355,060 A | 10/1994 | Peterson |
| 5,357,181 A | 10/1994 | Mutoh et al. |
| 5,473,229 A | 12/1995 | Archer et al. |
| 5,473,230 A | 12/1995 | Dunn et al. |
| 5,557,828 A * | 9/1996 | Reiner et al. .......... 16/257 |

(Continued)

FOREIGN PATENT DOCUMENTS

EP 0841574 A2 11/1997

(Continued)

OTHER PUBLICATIONS

R.C. Berkan, et al., Advanced Automation Concepts for Large-Scale Systems, IEEE Control Systems, Oct. 1991, pp. 4-12.

(Continued)

*Primary Examiner*—Rina I Duda  
(74) *Attorney, Agent, or Firm*—Turocy & Watson, LLP; R. Scott Speroff

(57) ABSTRACT

An integrated control and diagnostics system for a controlled system (e.g., a motor) includes a diagnostics module and a controller coupled to the motor. To optimize operation, the diagnostics information signal is used to modify the control provided by the controller as required. Moreover, the output of the control module is coupled to the diagnostics module so that the health assessment made by the diagnostics module can be based at least in part on the output of the controller. The invention uses a model-based diagnostics approach that allows integration of control algorithms with diagnostics algorithms to intelligently trade off optimizing performance to avert or accommodate failures, and to meet performance requirements in a wide range of applications.

19 Claims, 8 Drawing Sheets

U.S. PATENT DOCUMENTS

| | | | |
|---|---|---|---|
| 5,625,264 A * | 4/1997 | Yoon | 318/400.06 |
| 5,677,611 A | 10/1997 | Yoshihara et al. | |
| 5,734,242 A | 3/1998 | Iwashita | |
| 5,912,539 A | 6/1999 | Sugitani et al. | |
| 5,917,428 A | 6/1999 | Discenzo et al. | |
| 6,014,598 A | 1/2000 | Duyar et al. | |
| 6,035,265 A | 3/2000 | Dister et al. | |
| 6,046,560 A * | 4/2000 | Lu et al. | 318/432 |
| 6,157,156 A * | 12/2000 | Tsuruta | 318/609 |
| 6,199,018 B1 | 3/2001 | Quist et al. | |
| 6,330,140 B1 | 12/2001 | Wilson-Jones et al. | |
| 6,335,600 B1 | 1/2002 | Kasai et al. | |
| 6,459,972 B2 | 10/2002 | Kodaka et al. | |
| 6,784,687 B2 | 8/2004 | Tamura | |
| 2003/0182994 A1 | 10/2003 | Huller et al. | |
| 2003/0197384 A1 | 10/2003 | Vuk | |

OTHER PUBLICATIONS

Daw-Shang Hwang, et al., An Integrated Control/Diagnostic System for a Hard Disk Drive, IEEEE Transactions on Control Systems Technology, vol. 2, No. 4, Dec. 1994, pp. 318-326.

* cited by examiner

INTEGRATED CONTROL AND DIAGNOSTICS SYSTEMS

CROSS REFERENCE TO RELATION APPLICATIONS

This application is a continuation Ser. No. 10/654,776 filed Sep. 4, 2003, which is a co-pending divisional application U.S. patent application Ser. No. 09/911,130, filed on Jul. 23, 2001, which claims the benefit of U.S. patent application Ser. No. 09/461,787, now U.S. Pat. No. 6,326,758, filed on Dec. 15, 1999.

TECHNICAL FIELD

The present invention is directed generally to systems that perform both control and diagnostics operations on a monitored system, and more specifically, a system in which the diagnostics system is integrated with the control system to provide optimum control and health assessment of the monitored system based on the output of both systems.

BACKGROUND OF THE INVENTION

Known control systems typically are feed-forward or feedback systems, which implement closed-loop control to obtain and maintain certain operating conditions. Conventionally, control systems are often used to maintain a prescribed controlled system operating state or condition such as temperature, speed, position, trajectory, torque, etc., or to achieve a prescribed system state such as for motion control and robotics applications. These systems typically implement a stable control law that works to maintain operating performance notwithstanding certain operational and/or physical constraints and extekal disturbances. Moreover, many of these systems exhibit nonlinear characteristics. For example, servo actuator systems have inherent non-linear characteristics. Control design typically requires that a nonlinear system be treated as linear, usually by canceling the nonlinearity using feedback. These "linearizing" techniques have not found wide acceptance because they are generally not robust enough to operate in real-world applications. Often they are infeasible due to the large number of control inputs required to regulate the system. Consequently, these techniques have had relatively little use in solving real-world problems. For instance, the non-linearities associated with the aforementioned servo actuator systems cannot be ignored in control design. As such, a control system is needed that accounts for system nonlinearities using an alternative to correcting for such nonlinearlities with "linearizing" techniques.

Some known control systems utilize non-linear control methods such as model-reference (MRAC), gain scheduling, controller scheduling, fuzzy logic, or feedback linearization, to dynamically modify the operation of the controller in response to sensed changes in system behavior. Such changes in behavior include different system dynamics including compliance, noise or other related changes. Moreover, such systems may be time varying and may be difficult or impossible to model for control purposes. Notably, these control systems typically operate in isolation from any diagnostic or prognostic systems.

In addition to providing control, some systems implement independent diagnostics apparatus to monitor the overall health of either the apparatus being controlled, or the control system itself. Some systems may have no control, but only machinery diagnostics capabilities. Notably, assessing system health can be used to minimize unscheduled system downtime and to prevent equipment failure. This capability can avoid a potentially dangerous situation caused by the unexpected outage or catastrophic failure of machinery. Moreover, some diagnostic systems inconveniently require an operator to manually collect data from machinery using portable, hand-held data acquisition probes.

Other known systems have sensors and data acquisition and network equipment permanently attached to critical machinery for remote diagnostics. Typically the diagnostics equipment is directed to detecting problems with the control system hardware itself or monitoring the integrity of the output, i.e., monitoring when the control system response is outside prescribed time or value limits. As noted above, control system health monitoring, health assessment and prognostics generally are performed in isolation from any associated control system. These systems typically conduct passive monitoring and assess system health using diagnostic algorithms and sensors dedicated to establish system health. This passive monitoring is frequently done using off-line, batch-mode data acquisition and analysis to establish the health of the system.

For example, in FIG. 1, a conventional prior art automated control and diagnostics monitoring system 10 for use with a machine 12 that operates a plant (or as part of a process) is shown. System 10 includes a control module 14 that provides closed loop feedback control of machine 12 to maintain a set point condition (e.g., a velocity). In addition, system 10 includes a diagnostics block 16 electrically coupled to machine 12 for monitoring the health of the machine. In particular, diagnostics block 16 receives sampled systems data and processes the data to assess the health of the machine 12. A primary drawback of such a system is that diagnostics block 16 operates independent and isolated from control module 14 and performs off-line diagnostic processing which is not readily adaptable to integration with on-line control.

However, as noted previously, because virtually all diagnostics systems perform off-line diagnostic processing, it has been extremely difficult to implement diagnostics processing real-time in coordination with on-line control. Presently, no system exists which integrates control and diagnostics to optimize control outputs dynamically in real-time.

As a result, the art of control and diagnostics systems is in need of a control and diagnostics system that advantageously utilizes the outputs of each system to optimize the performance of both systems. Such a system would be able to dynamically optimize the operation of the controlled system by accurately diagnosing problems and predicting the future state of the controlled system based on health data from diagnostic sensors and/or from the control system. This would enable the system to alter the control operation in a goal-directed manner to facilitate diagnostics and prognostics, to reduce or eliminate excessive wear or degradation of the controlled system, or to achieve other operational objectives.

SUMMARY OF THE INVENTION

Notably, it has been determined that the information developed through the use of a diagnostics system is particularly valuable in assessing what type of control action should be applied to the monitored system. Vice versa, the output of the control system, which is based on controlled system response, is valuable in determining the overall health of the controlled system.

The preferred embodiment overcomes the limitations associated with prior systems which perform control and diagnostics operations independently on a controlled unit by utilizing advances in machinery diagnostics/prognostics in conjunction with conventional control hardware and non-linear/adaptive control techniques to provide a compact, cost-effective and intelligent system. The system of the preferred embodiment provides a tight coupling of embedded hybrid diagnostics and control to achieve optimum system performance in conjunction with reliable prognostics to facilitate maximizing machinery longevity and lowest cost of ownership. The integrated diagnostics and control elements of the present system allow efficient operation of the controlled system over its lifetime by intelligently predicting the time-life trajectory of the controlled system and altering operation accordingly.

The present invention readily utilizes existing architectures such as integrated motor-drive and motor-drive actuator systems which provide further enhanced operation by extending the life of these controllers with the use of model-based and qualitative/causal model information to provide intelligent control and diagnostics. More particularly, the model-based diagnostics approach of the present invention allows integration of the control algorithms with diagnostics algorithms to intelligently trade off optimizing performance to avert or accommodate failures, and to meet demanding performance requirements in a wide range of application environments. Overall, the result of implementing these features is a coherent, coupled control and diagnostics system that outperforms known systems having independent diagnostics and control apparatus operating in isolation.

According to a preferred embodiment, an integrated control and diagnostics system for a controlled unit includes a diagnostics module integrated with the motor that generates a diagnostics information signal indicative of the health of the motor. In addition, the system includes a controller integrated into the motor. To optimize operation, the diagnostics information signal is used to modify the control provided by the controller, as required. Moreover, the output of the control module is coupled to the diagnostics module so that the health assessment made by the diagnostics module can be based at least in part on the output of the controller and the systems response to this control action.

According to another aspect of the invention, the controller is associated with at least one changeable parameter, the parameter being changeable in response to the diagnostics information signal. Moreover, the controller preferably includes a velocity feedback loop and a torque feedback loop to implement the control.

According to yet a further aspect of the preferred embodiment, the integrated control and diagnostics system includes an enhancement module that generates an evolving set of design rules based on a plurality of the diagnostics information signals so as to facilitate designing an improved version of the motor and drive system. The enhancement module preferably includes a memory having a model embedded therein to generate the evolving set of design rules according to user specifications.

According to another aspect of the invention, the method of optimizing control and diagnostics operations performed on a controlled unit includes the steps of providing a diagnostics module and a control module, each of which is integrated with the controlled unit. In addition, the method includes the step of generating a control signal with a control module in response to feedback from the controlled unit and generating a diagnostics signal indicative of the health of the controlled unit, with the diagnostics module, based on the control signal. Also, the method includes the step of predicting when a controlled unit failure will occur, as well as the cause of the controlled unit failure. Finally, the method includes the step of determining whether to alter the control signal based on the predicting steps.

According to yet a further aspect of the preferred embodiment, a method of optimizing the useful life of a motor according to a preventive maintenance schedule that includes a plurality of preventive maintenance checkpoints includes the step of sensing a motor parameter during operation of the motor. Thereafter, the method includes generating a control signal with a controller based on the motor parameter and then diagnosing a health condition of the motor based on at least one of an operating objective, the control signal and a process constraint. The method also predicts, based on the health condition, whether a motor fault condition will occur prior to the next preventive maintenance checkpoint and then determines whether to alter the control signal in response to the prediction. If the altered control signal is then issued, the method will again determine if a motor fault will occur under the new control scheme prior to the preventive maintenance checkpoint, and then prescribe any necessary change in the control.

These and other objects, features, and advantages of the present invention will become apparent to those skilled in the art from the following detailed description and drawings. It should be understood, however, that the detailed description and specific examples, while indicating preferred embodiments of the invention, are given by way of illustration and not of limitation. Many changes and modifications may be made within the scope of the present invention without departing from the spirit thereof, and the invention includes all such modifications.

DETAILED DESCRIPTION OF THE INVENTION

Figure 1:
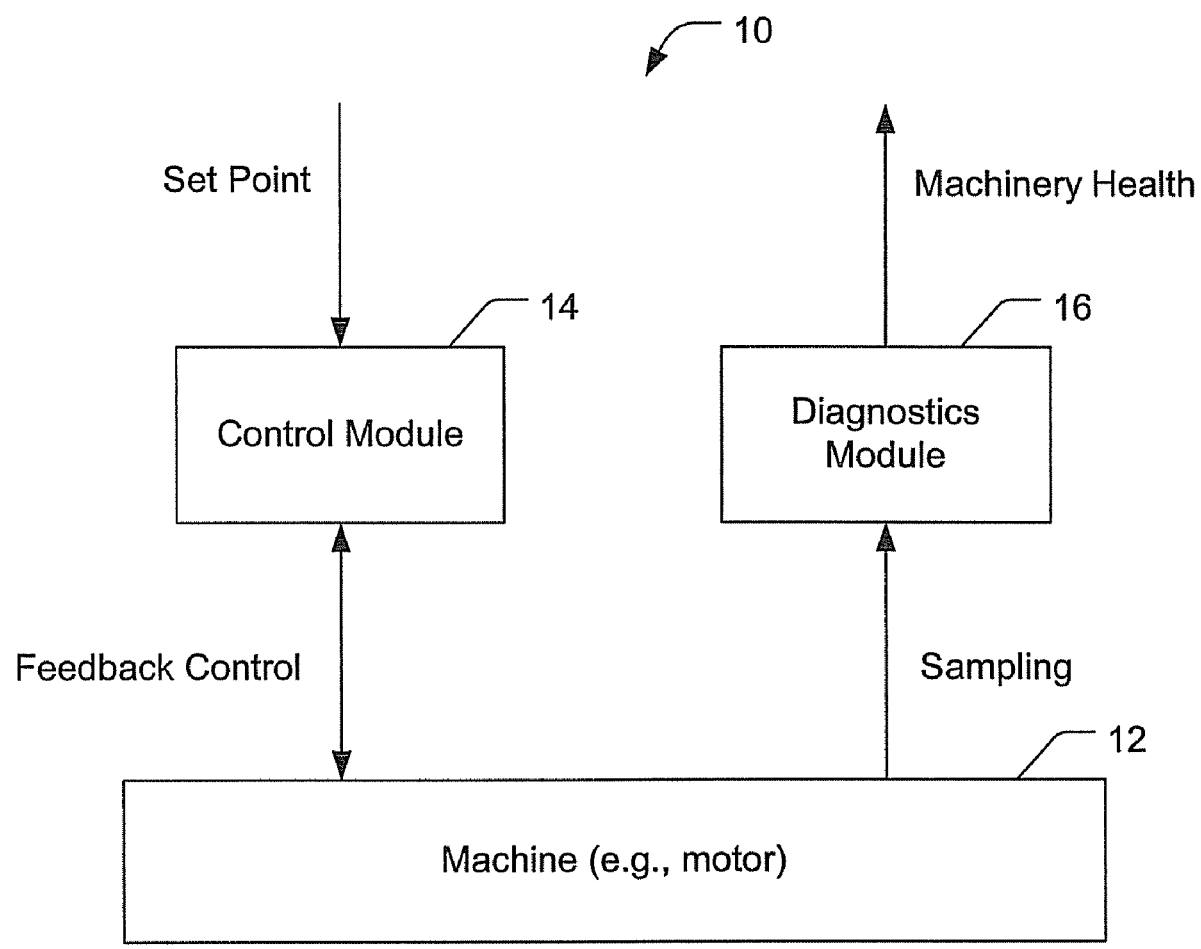
FIG. 1 is a block diagram of a prior art system including independent diagnostics and control apparatus.
Figure 2:
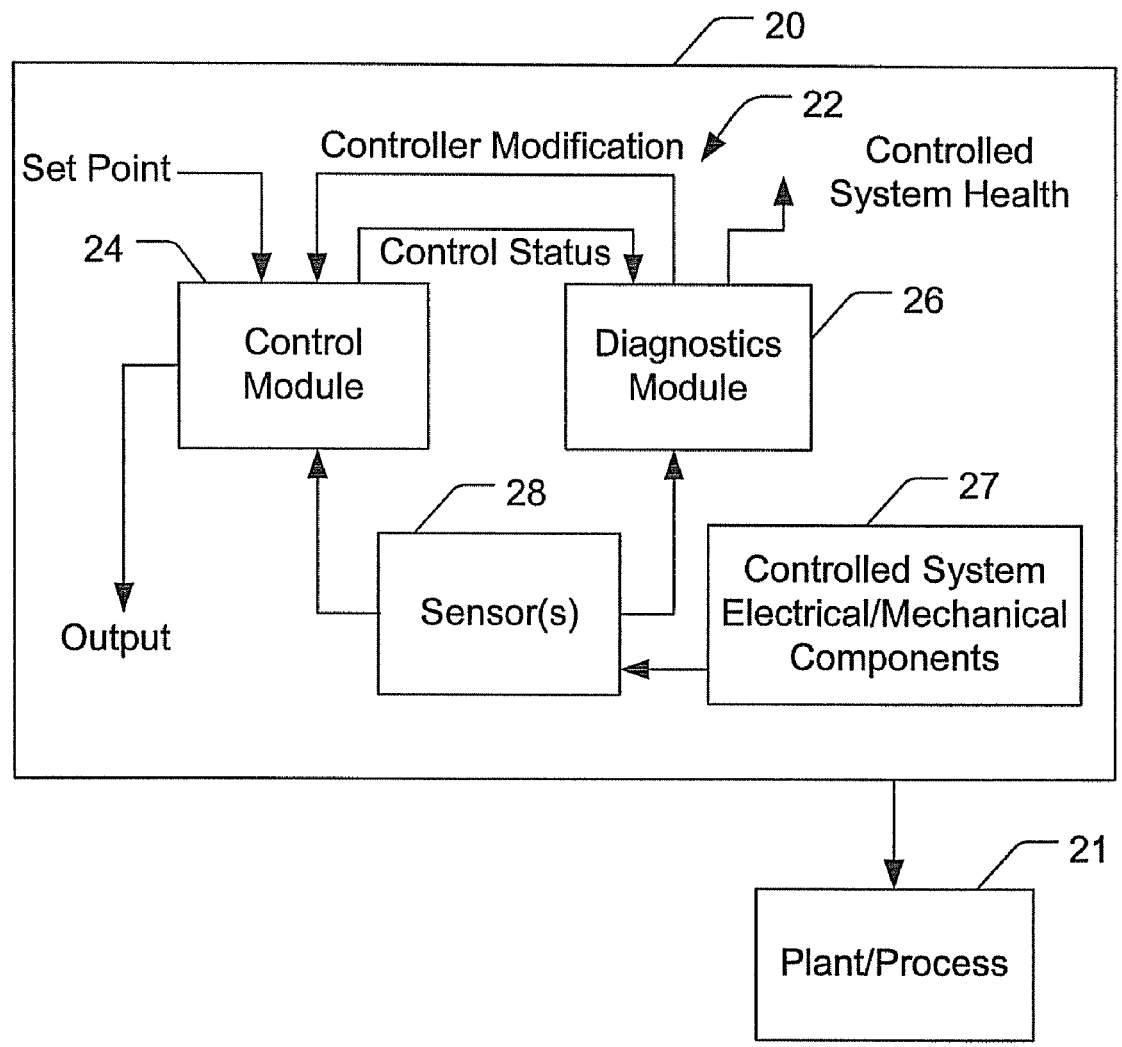
FIG. 2 is a generic block diagram of an integrated diagnostics and control system according to a preferred embodiment of the present invention.

Turning initially to FIG. 2, a controlled system 20 (e.g., a motor) includes an integrated control and diagnostics system 22 for operating a plant or process 21. System 22 includes both a control module 24 and a diagnostics module 26 in a tightly coupled hybrid configuration. With the integrated configuration, the control and diagnostics modules 24 and 26, respectively, are preferably packaged in a single unit and thus able to share a common set of sensors 28 to collect system data, and a common bus or shared memory to exchange data and information. Sensors 28 preferably comprise a plurality of sensors embedded in controlled system 20 to measure parameters associated with controlled system electrical/mechanical components 27 (for example, stator windings) including, inter alia, motor speed, motor current, voltage, temperature, vibration, magnetic flux, and lubrication characteristics. Although preferably implemented with cost-effective, off-the-shelf sensors, sensors 28 can be implemented with sensor technology that includes intelligent sensors, self-validating sensors and smart sensors with embedded diagnostics. In one preferred application, the hardware components of the system shown in FIG. 2 can be assembled to comprise an intelligent servomotor including a brushless DC motor with integrated control, diagnostics, communications and power electronics.

Control module 24 is communicably integrated within controlled system 20 in a closed-loop feedback configuration and outputs an appropriate driving output to maintain operation of controlled system 20 at a predetermined set point value (e.g., at a particular velocity). In operation, control module 24 receives a data signal from sensor 28 and processes that signal to generate a driving output. In addition to applying the driving output to controlled system 20, system 22 can use the driving output to facilitate generation of an assessment of the health of the controlled system 20, or perform a system simulation. The health assessment is generated by an algorithm designed according to a particular model associated with controlled system 20, as discussed in further detail below. Integrated diagnostics module 26 is preferably of the type shown and described in U.S. Pat. No. 5,917,428 to Discenzo et al., which is expressly incorporated herein by reference. The module disclosed in Discenzo et al. uses an on-board processor and sensors to provide diagnostics for motor bearings and other mechanical and electrical components based on current, voltage, stator temperature, vibration measurements, etc. In addition to indicating the health of controlled system 20 to the operator, an output of diagnostics module 26 may be applied to control module 24, preferably as a recommended change in control when necessary.

Overall, integrated control and diagnostics system 22 operates to efficiently utilize both control and diagnostics features to maximize, for example, the time-life trajectory (i.e., a relationship showing how the performance of the controlled system changes over time and eventual system failure and under various operating parameters) of controlled system 20 according to detailed user specifications. For example, if the output of diagnostics module 26 indicates that motor stator winding insulation failure is imminent, the drive algorithm (embedded in control module 24, described below) can be dynamically reconfigured accordingly to reduce the possibility of a premature, inconvenient or hazardous outage. Conversely, diagnostics can be optimized by stimulating the system via actuation of the control and thereafter observing the system response.

Figure 3:
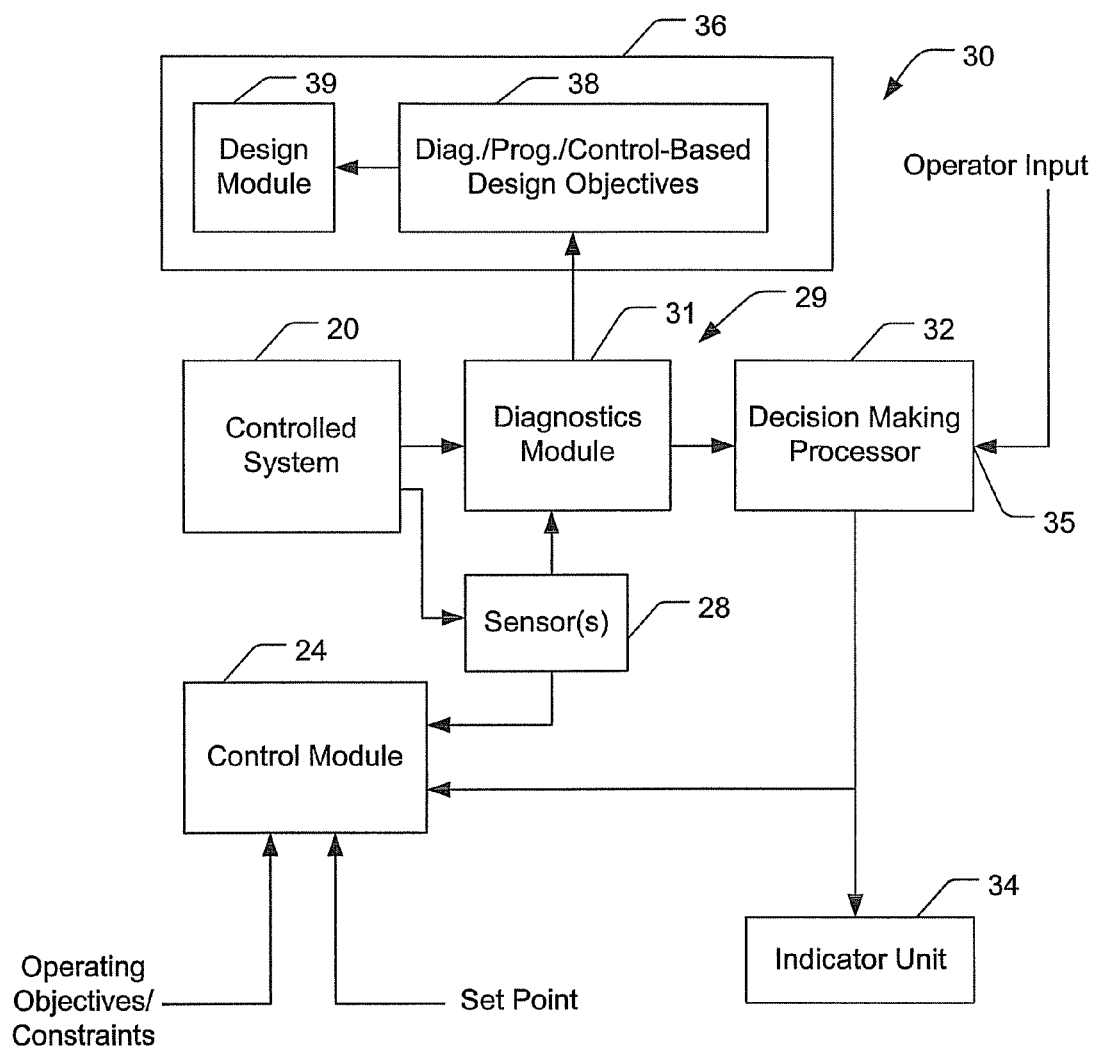
FIG. 3 is a more detailed block diagram of the system shown in FIG. 2.

Next, as shown in FIG. 3, a more detailed schematic of a system 30 includes an integrated diagnostics and control system 29 having a control module 24 and a diagnostics module 31 coupled to a controlled system 20. The hardware of control and diagnostics system 29 is preferably modular and is based on application specific integrated circuits (ASICs), advanced power control, and implements thermal management techniques. Further, by using a Silicon-on-Insulator (SOI) process to achieve higher voltage isolation, the control logic, gate driver, and power switches remain integrated on a single chip for low power applications up to 155V. On the other hand, the control and power circuits are separated into distinct components for higher voltage/power applications. The power converter (not shown) uses 460V 3-phase AC supply and is preferably designed for integration with a twenty-five horsepower induction motor. In the preferred embodiment, the power converter employs power-switching control to reduce the need for large DC-link capacitors and utilizes microchannel cooling structures to reduce the size of the heat sink. The control algorithm is based on the systematic use of small controls or low-gain design techniques that exploit the inherently dominant nonlinearities of the dynamic system, rather than using feedback controls incorporating approximation or feedback linearization. The main purpose of the feedback control in the present system is to regulate the system in the large and in a manner that is not sensitive to various perturbations, disturbances and uncertainties in the system.

Controlled system 20 is monitored by diagnostics module 31 that is preferably implemented with an ASIC that provides a flexible sensor interface and diagnostic signal processing functions. In operation, diagnostics module 31 continuously obtains data (e.g., relating to temperature, velocity, etc.) from controlled system 20 via sensor(s) 28 coupled thereto. More particularly, diagnostics module 31 performs a health assessment of controlled system 20 based on the sensor data and generates a corresponding signal indicative of the health of controlled system 20. In general, the health assessment signal is indicative of any deviation in controlled system operation from one or more normal operating characteristics associated with the controlled system. Notably, sensors 28 may be supplemented with specialized algorithms that utilize controlled system 20 as a probe to diagnose problems associated with the connected plant or process, or sensors 28 may employ virtual or computed sensor functions (for example, to reduce sensor needs), such as that shown and described in U.S. Pat. No. 5,995,910 to Discenzo entitled Method and System for Synthesizing Vibration Data, which is expressly incorporated herein by reference.

With further reference to FIG. 3, diagnostics module 31 is coupled to a decision-making module or processor 32 (which may be integrated with diagnostics module 31), for transmitting the health assessment signal to the control module 24 or to an external indicator unit 34 or to the operator. Processor 32 processes the health assessment signal, preferably according to a particular model or suite of models, to determine necessary system changes (e.g., in terms of the control provided by control module 24) to optimize operation. In addition, optimization parameters including job specific, and/or mission or system specific parameters may also be input to processor 32 via auxiliary inputs 35. For example, the optimization parameters may designate requirements relating to mission requirements, workload schedule, environment, preventive maintenance schedules, etc. Together with the health assessment signal, the optimization objective(s) and operating parameters and constraints can be used to facilitate generation of a system recommendation signal to alter the control supplied by control module 24.

More particularly, control optimization, as well as health assessment, is processed according to an algorithm(s) executed by processor 32. The algorithm is preferably designed according to the specifications of controlled system 20 and accounts for parameters such as susceptibility of the controlled unit to degradation over time and under certain operating conditions. In general, model-based techniques are used that incorporate critical information about the dynamic characteristics of controlled system 20. The model optimizes the ability of the system to simultaneously detect and diagnose incipient faults before they render the system inoperable, and then alter the control to accommodate the anticipated faults accordingly. The preferred approach integrates conventional techniques such as Discrete Fourier Transform (DFT), Gabor Transform, Wigner-Ville distribution, etc. with more advanced techniques such as wavelet decomposition, non-linear filtering-based statistical techniques, and analysis of time series data using non-linear signal processing tools such as Poincare' maps and Lyapunov spectrum.

Poincare' maps and Lyapunov spectrum are analytic techniques that provide a unique view or window into non-linear dynamical systems. These techniques indicate the degree of chaotic behavior in what appears to be a random process and can characterize the chaotic mapping derived as an indicator of system operating state. For example, some mechanical systems have been shown to exhibit an increase in chaotic behavior with the onset of mechanical instability due to lubrication problems. Poincare' maps and Lyapunov numbers, among others, are derived analytically from sampled time series data of the type available to diagnostics module 31.

For example, both windowed Fourier transform and the wavelet transform have time-localization properties that are important in the diagnosis of rotating machines. It is known that the "graceful" degradation of a bearing in a rotating machine can lead to packets of high frequency data that are localized in time. This can be interpreted as a signature of the failure mechanism, and identification is dependent on extracting this signature from the real-time sensor data. Notably, wavelet transform is well suited for the time-frequency decomposition of signals that have short-lived high frequency components, and that are superimposed on a lower frequency carrier. This type of data is generated by system failures such as wear induced contact in the bearings and tooth damage in the meshing gears. Furthermore, recent developments in wavelet based de-noising schemes are utilized to extract meaningful information from data obtained from noisy sources, such as the interior of the rotating machinery. The wavelet transform establishes a series of basis functions (e.g., low order polynomials) and these functions are used to represent the time series data. The careful choice of basis functions provides information regarding both the time domain and frequency domain characteristics of the data. A periodic impulse would be smeared across all frequencies in a Fourier Transform and be indistinguishable. Alternatively, using time domain techniques requires frequent data sampling and data evaluation in order to not miss detecting the occasional impulse event. Wavelet transform techniques provide for joint time-frequency analysis by analyzing the resultant basis functions and their coefficients. Therefore, for some types of machinery failures, incipient fault detection using wavelet transform is preferred over the windowed Fourier transform.

Moreover, when controlled system 20 comprises rotating machinery, chaos-tracking techniques are also used in the diagnosis approach of the preferred embodiment. An important ability of chaos tracking techniques is to adaptively correlate patterns in the vibration orbit trajectories with certain problems in rotating machinery. Using such a chaos tracking technique, the preferred embodiment models the physical mechanisms that can lead to machine problems. More particularly, for each particular problem to be diagnosed (for example, rub-impact in a bearing or unbalance in a rotor), a mathematical model is developed. The models used by the present invention have adjustable parameters developed with computer simulation that account for a wide variety of applications. Chaos tracking templates are then used for each detection and diagnosis scenario.

In operation, detection and diagnosis can be accomplished with pattern matching. That is, given vibration data from the controlled system 20, chaos-tracking methods (e.g., generating a Poincare' map) process the data and generate a pattern for the current operating condition. The method of the present invention then compares this pattern with the various templates that have been developed through experimental testing and simulation. Statistical correlation and pattern matching techniques are then used to determine the most likely operating scenario, and thus to indicate the health of the system. For example, based on historical data along with device and process physics, we may establish a set of probabilities such that given a series of observable symptoms; we will ascribe a certain (e.g., fault mode) health state to the system with a particular probability. Based on this and additional information, system 30 improves this health assessment. For example, techniques such as Dempter-Shaefer Theory can be used to establish this more accurate health assessment. Other techniques such as artificial neural net classifiers, as are well known in the field, can also be included in this preferred implementation.

For example, some notable problem sources due to vibration in a motor include loose rotor-bearing support or components, rub/impact phenomena between the rotor and the non-rotating surface, propagating cracks in a dynamically participating flexural component (e.g., a shaft). Other problem sources include backlash, play (dead band), Hertzian contacts or bilinear flexibility, and non-linear resistive, inductive or capacitive elements including motors, generators and electro mechanical network interactions.

Notably, the embedded models may also implement "rules of thumb" associated with the system. For example, such a rule may indicate that for a particular controlled system 20 the system may lose half its life for every ten-degree increase in temperature. Overall, the present invention accounts for all the above-described rules, objectives and constraints so as to intelligently generate a system recommendation for optimum controlled unit operation.

Next, the recommendation may include generating a signal, for example, to activate an emergency shut down, to indicate when to replace the bearings, etc. Most typically, diagnostic/prognostic information will be used to alter the controller or control strategy to avert or accommodate faults. For example, the control can be modified to allow a weakened component to survive under a smoother, but less efficient control law. As a result, the mission can be completed under less equipment stress conditions until the next scheduled shut down of the controlled system 20 (e.g., preventive maintenance checkpoint) or other convenient shutdown time. Notably, the recommendation signal generated from the decision-making module can be used to direct a reconfiguration of the system and its operation. Such a reconfiguration will enable meeting the system operating goals and lifetime requirements in a manner superior to that achieved by merely changing the control. For example, with multiple motor-pumps controlling a ship's change in ballast, system 30 can reconfigure the piping to load share with the motor, which can be prone to excessive heating or cavitation when running at full pump speeds. This allows dynamically extending machinery lifetime and meeting performance requirements in a manner superior to just changing machinery control.

Generally, processor 32 operates to dynamically alter parameters associated with control module 24 coupled thereto, thus providing multi-objective optimization of the control. By intelligently altering control in this fashion, a variety of control functions may be realized including enabling stimulus-response analysis, altering the time-life trajectory associated with controlled system 20, predicting safe operation beyond normal operating regimes, and executing more efficient and accurate control output, etc. For example, stimulus-response analysis can be activated based on the recommendation (or a unique control action via, for example, and impulse or step) to prove or disprove a particular diagnostic hypothesis by (1) causing the control system to excite a particular condition within the system, and then (2)

analyzing the system response. Knowing the control action and resulting system response enables system 30 to generate an enhanced model of the system for diagnostics; for example, system 30 can be implemented to perform system identification and establish a plant transfer function. Also, because the control provided by control module 24 is dependent on the diagnostics/prognostics, system 30 provides redundancy in the event that some control components (e.g., sensors) fail.

In addition to the recommendation generated by processor 32, processor 32 generates an indicator signal to notify the operator of a particular condition via indicator unit 34 (e.g., an indicator alarm) coupled thereto. Notably, processor 32 may also send the signal to another computer system such as a maintenance management system (CMMS), or to another diagnostics or decision-making module for coordinating optimum operation of multiple systems.

The control provided by control module 24 is also dependent upon any operating objectives and constraints either input by the user or generated by system 30 itself. For example, if the data provided by sensors 28, and processed by diagnostics module 31, establishes that a particular frequency excites a resonance within the system that compromises the integrity of the output, control module 24 accommodates this process constraint by providing an appropriate control signal to avoid system operation at that particular frequency. For example, the drive characteristics can be changed in a motor-driven system to shift losses from a weakened motor to a stronger inverter by shifting to a lower PWM frequency at the expense of less efficient system operation.

Alternatively, the system may require asymmetric firing of a three-phase motor (i.e., the controlled system) to minimize the stress exerted on a particular phase of the three-phase windings of the motor. Yet another example of an operating objective is restricting the rate of current increase to a certain amount to optimize system performance, for example, in terms of longevity. Other constraints/objectives include maximum throughput, lowest wear rate, lowest costs of ownership (including energy utilization), etc. How these operations are implemented is discussed in further detail below.

Also shown in FIG. 3 is an enhancement system 36 coupled to integrated diagnostics and control system 29 and including a diagnostics/prognostics module 38 and a design module 39. Enhancement system 36 provides an evolving database of design rules and objectives to facilitate determining beneficial modifications to the design of controlled system 20 to enhance the ability of future generations of controlled system 20 to perform early failure detection and compensating control. During operation, health assessment signals generated by diagnostics module 31 are transmitted to diagnostics/prognostics module 38. Module 38, during an off-line batch mode process, processes the health assessment signals to generate a diagnostics/prognostics signal that is input to design module 39. In response, design module 39 develops a continually evolving database of design rules.

For example, to aid in early insulation failure detection (if this occurs frequently), the design may include a separate winding with reduced insulation which is not essential to the motor operation. If PWM frequency is frequently being shifted, hardware and software changes may be required for this to be done more readily, and over a wider frequency range. These rules can then be compiled for use by the engineers/operators in designing future generations of controlled system 20. For example, based on the health assessment and the operating conditions, design module 39 may determine that a component of the controlled unit needs to be made according to different specifications and tolerances in view of predetermined parameters, e.g., costs, reliability, etc., when being operated under the same or similar conditions. Generally, some benefits realized by enhancement system 36 include longer control system life, increased fault tolerance within the control system, facilitating prognostic analysis, more effectively compensating control, reduced catastrophic failures, lower repair cost, etc.

Figure 4:
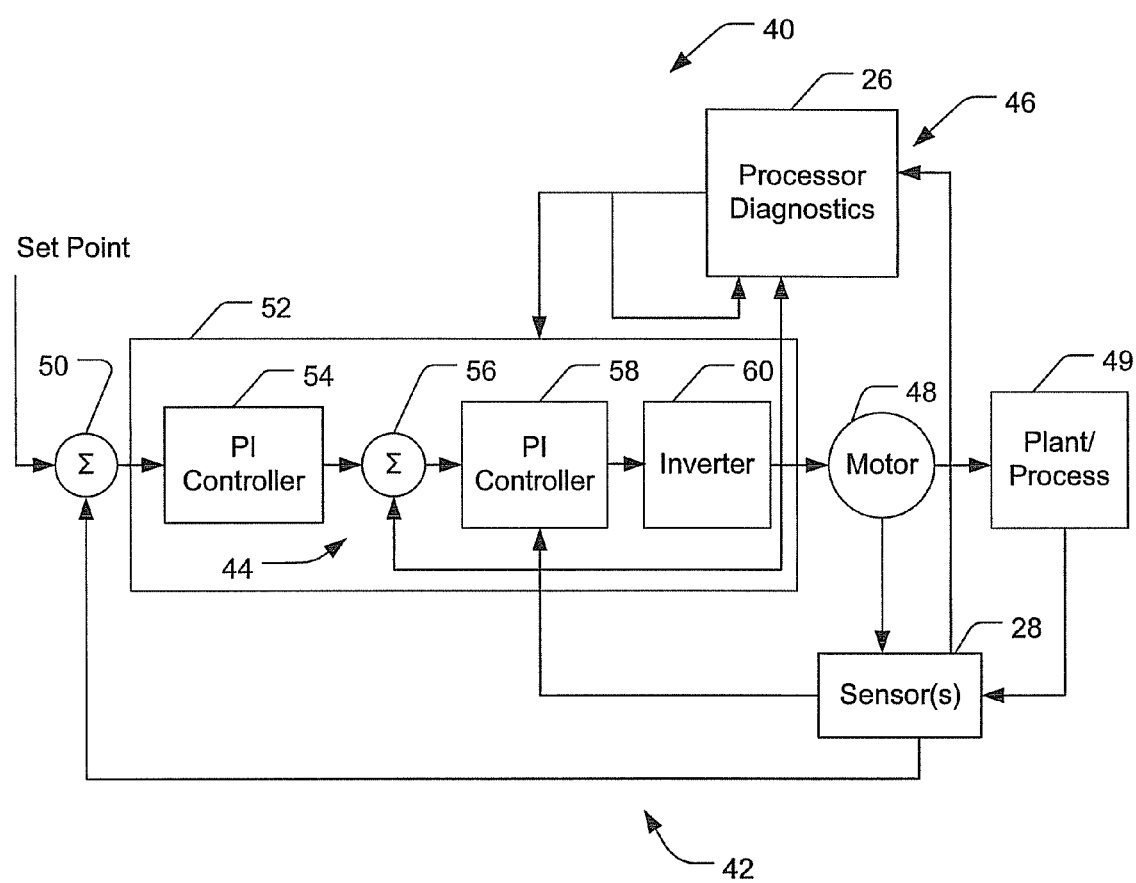
FIG. 4 is a circuit diagram of a system according to a preferred embodiment of the present invention.

Turning to FIG. 4, a schematic of an integrated diagnostics and control system 40 is shown. System 40 receives an excitation signal and includes two feedback loops 42 and 44 to implement control, and a diagnostics loop 46 for monitoring the health of a controlled unit 48. Controlled unit 48 can be, for example, a motor that drives a plant or process 49 such as a pump. In operation, controlled unit 48 is monitored with sensor(s) 28 (e.g., position/velocity sensor) that outputs a velocity feedback signal indicative of the actual velocity to a comparison circuit 50 that compares the velocity feedback signal to a predetermined setpoint value (e.g., a desired velocity). Comparison circuit 50 generates a first error signal, a velocity error signal, with the velocity error being equal to the difference between the velocity feedback signal of the controlled unit 48, and the setpoint. The velocity error signal is then applied to a system controller 52 that generates a control signal and transmits the control signal to controlled unit 48. System controller 52 receives the velocity error signal and generates a command or reference signal that is applied to controlled unit 48 to minimize the velocity error.

More particularly, system controller 52 includes a first controller 54 (e.g., a P-I controller) that receives a velocity command signal and generates a current reference signal that is applied to second feedback loop 44. Second feedback loop in turn, generates the control signal that is applied to controlled unit 48 to maintain operation at the set point. The second feedback or torque control loop 44 provides a "current feedback" signal indicative of the actual motor current obtained from current sensors preferably mounted within the motor, although they may be integral to the inverter and remote from the motor. Torque control loop 44 minimizes the "torque error" by initially determining the torque error by comparing the current reference signal generated by first feedback loop 42 to the current feedback signal with a second comparison circuit 56. In other words, the torque error is the difference between the actual current that flows through the motor and the reference current. The torque error is then applied to a controller 58 (e.g., a P-I controller), which processes the current error to generate a modified current signal that compensates for the torque error signal that is applied to an inverter 60. Inverter 60 then processes the modified current signal to generate the driving output (current or voltage) that is applied to controlled unit 48 to achieve the desired controlled unit operating state. Notably, because current and torque are directly related, current control loop 44 effectively implements a torque control loop, similar to velocity control loop 42. In sum, the control signal output by controller 58 (and specifically current control loop 44) minimizes the current error and controls the voltage applied to, for example, the motor windings of controlled unit 48.

The output of sensor(s) 28 is also coupled to a diagnostics module 26 which provides a health assessment of controlled unit 48 based on the output of sensor(s) 28 (e.g., position/velocity, torque, etc.), and a control recommendation is generated based on the health assessment. Notably, the health assessment preferably is based not only on the output of sensor(s) 28, but also on the control signal output by controller 52 to minimize current error (described above), and the control recommendation output by diagnostics module 26 itself. Further, diagnostics module 26 can consider the previous control commanded to the motor 48, along with the current state of motor 48, to get a better indication of motor health and thus generate, for example, an appropriate transfer function.

In operation, motor 48 is continually monitored for health as sensor(s) 28 provides updated data so as to allow diagnostics module 26 to continually modify and optimize system control. Further, system 40 can be used to maximize the integrity of the health assessment based on the control provided, as described above. Note that the system components shown in FIG. 4 can be implemented independent of motor 48 or mounted integral with the motor or an actuator.

Figure 5A:
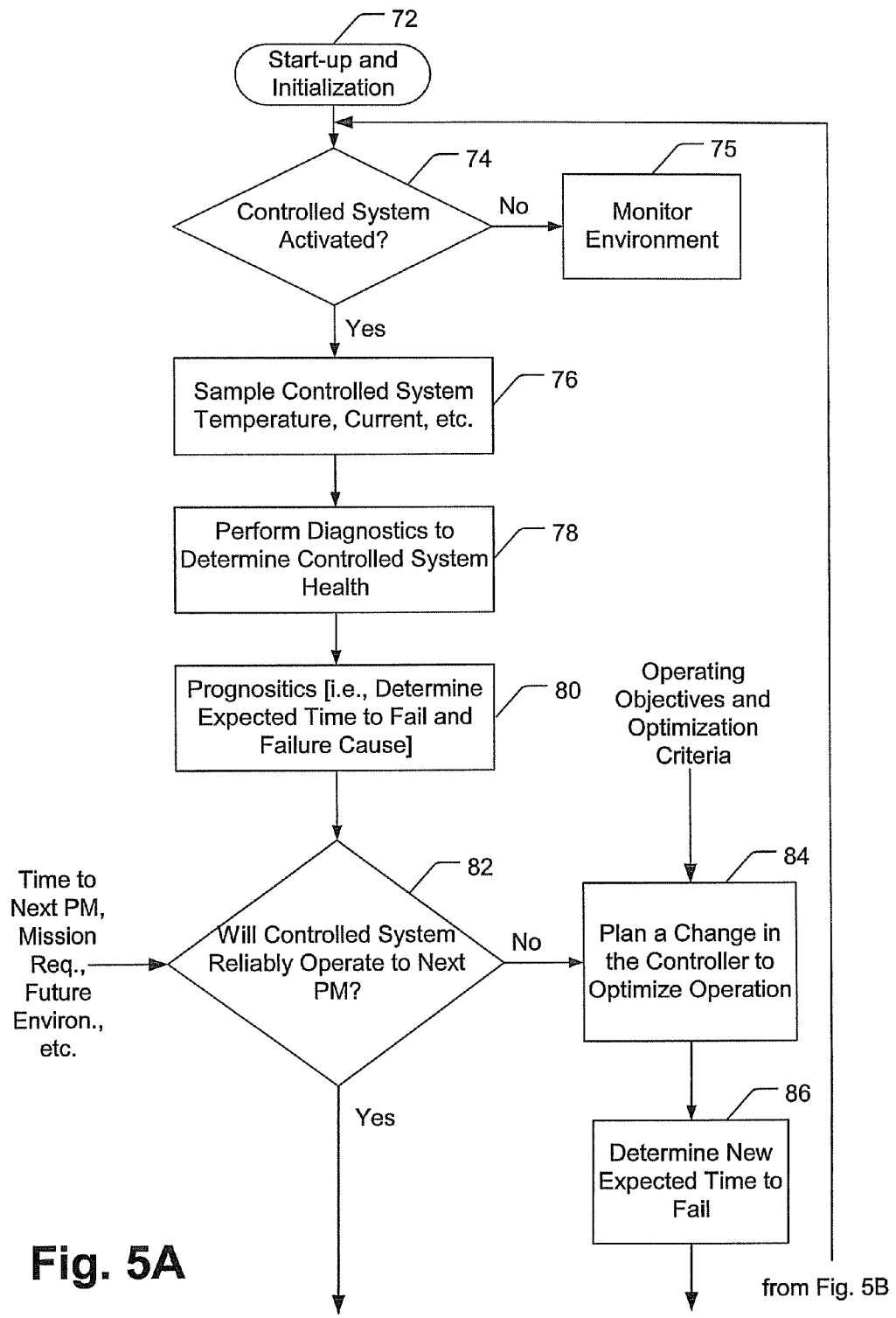
FIGS. 5A and 5B is a flow chart showing the operation of the system shown in FIG. 4.
Figure 5B:
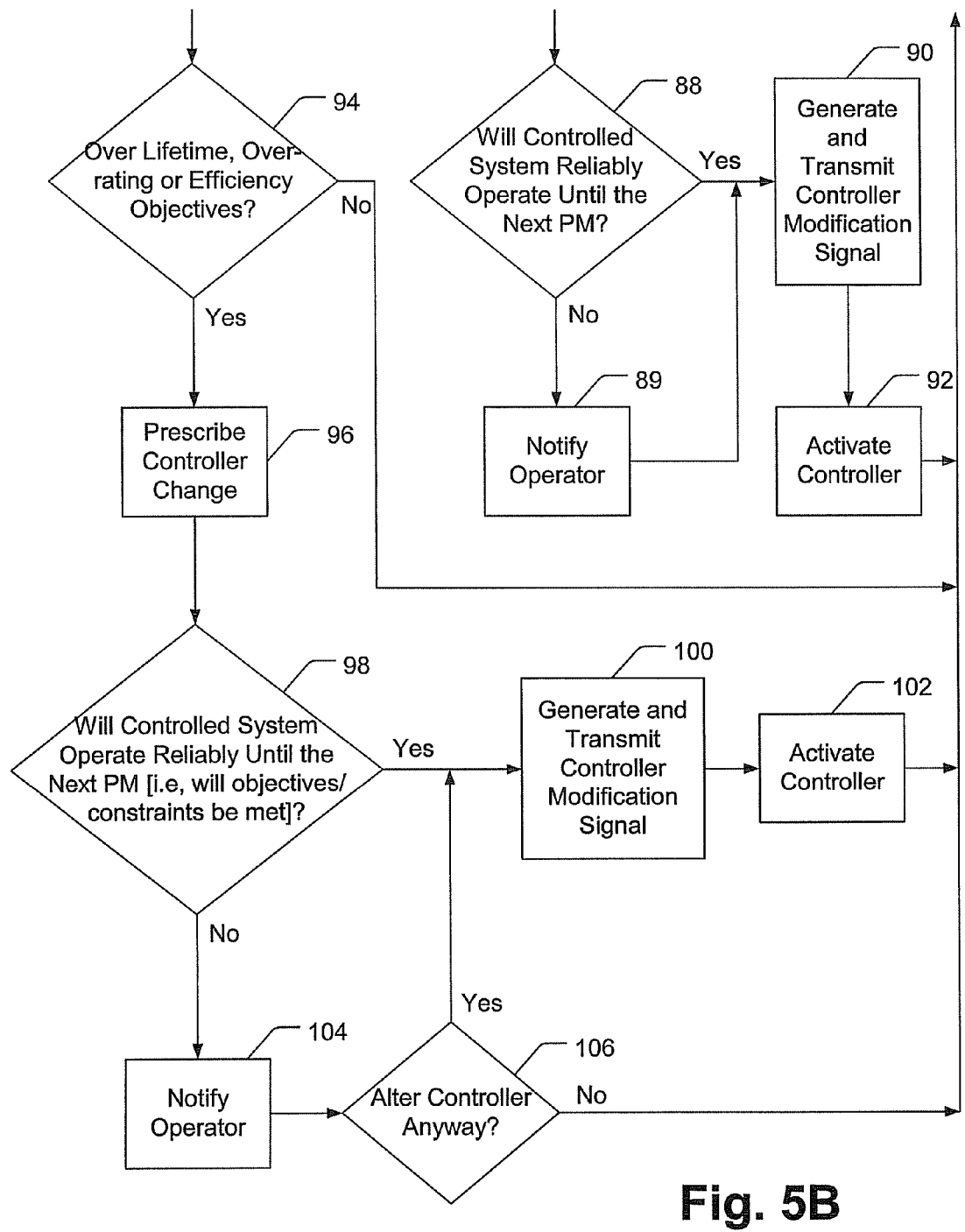

With reference to FIGS. 5A and 5B, a program 70 for operating integrated control and diagnostics system 40 shown in FIG. 4 is shown. Program 70 is an adaptive model that utilizes feedback to actively control, inter alia, the time-life trajectory of the system. After initialization and start up at Step 72, program 70 determines whether the controlled system (e.g., a motor) is activated at Step 74. In the event that the program 70 determines that controlled system is not activated in Step 74, the integrated controller/diagnostics system of the preferred embodiment may still execute diagnostics operations based on data collected by the system sensors. For instance, the environment in which the system is implemented may need to be considered to accurately assess motor health and, in particular, vibration in the environment may pose a significant threat to efficient motor operation. Therefore the effects of such vibration should be monitored, even when the controlled system is not operating.

If the controlled system is activated, motor parameters such as temperature, current, etc. are sampled at Step 76 and transmitted to a diagnostics module (26 in FIG. 4) to determine the health of the controlled system at Step 78. Thereafter, at Step 80, program 70 determines the remaining lifetime of the controlled system and likely failure cause based upon the health assessment performed in Step 78. After the determinations in Step 78 and 80 are complete, a decision is made as to whether the motor will live to the next preventive maintenance check (PM) at Step 82. Not only is the determination made in Step 82 dependent upon the remaining motor lifetime and projected failure cause determined in Step 80 but, in addition, is based on variables such as the rated duty associated with the controlled system, the time to the next preventive maintenance check, the environment in which the controlled system is operating and is expected to operate in the future, etc., which may be input by the operator or comprise part of the model and mission associated with the controlled system.

In the event that system 70 predicts that the controlled system will not reliably operate to the next preventive maintenance checkpoint or complete the needed mission or job run, program 70 executes Step 84 to (1) determine what changes in control will provide the desired system operation, and (2) generate a control recommendation. In addition to the determinations made in the previous steps, the control recommendation can be based upon operating variables including process constraints (e.g., avoid operating at a particular frequency) and operating objectives. The constraints preferably are input by the user or determined by the integrated diagnostics, machinery and process models, and wear and degradation models, as well as the control system itself based on the sensor data. The constraints can indicate an amount of allowable risk and the certainty of normal operation required. For instance, knowing that the system will not accept any risk of complete shut down, the program can change the control to insure that the system will be one In response to the control recommendation, program 70 determines a new expected time to fail (similar to the determination made in Step 80) at Step 86. If the system will reliably operate until the next preventative maintenance checkpoint or complete the needed mission, as predicted in Step 88, a controller modification signal is generated and transmitted to the controller (e.g., 52 in FIG. 4) in Step 90 to change the controller parameters (e.g., parameters of inverter 60 in FIG. 4) according to the control recommendation (Step 84). Then, in Step 92, the controller is activated to receive the controller modification signal. Notably, a separate controller activation step is preferred to account for any potential stability problems. In particular, at Step 92 program 70 makes a determination as to whether the system will fail or go unstable with the planned change in control so as to accommodate the change accordingly.

In the event that program 70 determines, at Step 88, that the system will not reliably operate according to the process constraints, motor specifications, etc., until the next preventive maintenance checkpoint, the controlled unit operator will be notified of the predicted failure prior to the next preventive maintenance check at Step 89. In addition, at Step 89, program 70 still preferably outputs a signal to the controller (Step 90) to alter the controller according to the control recommendation determined at Step 84. As a result, the system maximizes controlled unit operating lifetime under the existing operating constraints, notwithstanding the predicted failure prior to the next preventive maintenance check. The expected time to fail determined in Step 86 is also saved and used in Step 80 in future program iterations to in fact confirm that the equipment will operate until the next preventive maintenance checkpoint. If not, changes in future iterations of Step 84 will be made.

Next, if in Step 82 the program 70 determines that the controlled system will reliably operate until the next preventative maintenance checkpoint, optimization criteria including lifetime, overrating, efficiency objectives are considered at Step 94, thus allowing the operator to customize operation of the controlled unit. Such optimization criteria may include detailed operational requirements such as operate the motor at 200% duty in one hour periods. Other optimization criteria may be indicative of the user's desire to run the motor as long as possible without considering efficiency issues. Or, the operator may not care if the motor dies in a relatively short period; rather, the user may just want to minimize, for example, energy consumption. Still other optimization criteria may include operate at lowest cost, longest operating time, higher efficiency maximize throughput, lowest lifecycle cost, etc.

If no optimization criteria are input to the system, program 70 does not make any additional determinations regarding change in control, as the system will last to the next preventive maintenance checkpoint as desired. Program 70 then returns operation to initialization and start up at Step 72. However, if other optimization criteria/operational constraints are to be considered, program 70 executes Step 96 to prescribe a change in the controller to meet these criteria. Notably, the closed-loop analysis of the system after prescribed controller change allows enhancing control and prognosis algorithms. The prescribed controller change is implemented with linear or non-linear programming.

Conventional optimizing control and dynamic optimization techniques can also be scheduled for implementation in Step 96. We may shift gains to minimize the maximum current draw or, in fact, implement a fuzzy logic controller to smoothly implement new control objectives. The prescribed change in the controller in this case may consist of shifting the fuzzy sets used in the fuzzy logic-based controller, for example.

Thereafter, in Step 98, program 70 determines whether the prescribed controller change (determined in Step 96) will ultimately meet the operating objectives and constraints. If the constraints considered in Step 94 will be met, a signal indicative of the prescribed controller change is generated and transmitted to the controller at Step 100. Thereafter, at Step 102, the controller is activated, as described above.

Alternatively, if the system will not meet the constraints input at Step 94, the operator is notified at Step 104 and, in Step 106, a determination is made as to whether the controller should be altered anyway. In the preferred embodiment, the program will alter the controller anyway according to the prescribed controller change generated in Step 96 to achieve the longest controlled system lifetime without compromising system performance. Nevertheless, if program 70 determines that the controller should not be altered in Step 106 the execution of the program is again returned to initialization and start up at Step 72.

An important aspect of the preferred embodiments is that the models used to predict controlled unit lifetime, etc. are adaptive models, rather than open loop or feed-forward models. If, for example, the controlled unit does not run as cool as predicted in response to a corresponding change in control, the integrated diagnostics and control system will alter the model (for example, embedded in diagnostics module 26 in FIG. 4) so that the next time program 70 executes a step calling for a prediction, the prediction will be more accurate. For example, the lifetime prediction model may be altered in an automatic, adaptive manner based on the previously predicted lifetime of the system and its observed rate of degradation or aging. This may consist of altering coefficients, which reduce the forecasted lifetime of machinery based on the number of degrees over nominal temperature. Alternatively, a non-linear model in time (e.g., an iterative model) may be developed, and refined empirically based on an observed rate of system degradation.

In sum, program 70 uses an adaptive model to predict and record a new time to fail and, then the model is tested to determine if the prediction was correct. As discussed above, the model may account for how insulation degrades with temperature, how bearings degrade with vibration and/or temperature, how lube degrades, etc. In addition, parameters such as the environment and predicted future environment will change such that the predictions must account for such changes and the uncertainty in environment projections (for example, at Step 98). For a particular environment, and for a certain model associated with the controlled unit, the model predicts how the controlled unit will operate and how the controlled system will respond to different stresses produced by the environment. Then, upon each iteration of program 70, a life history of the model is generated so as to facilitate the development of an improved model for the system, and to optimize the time-life probability curve associated with the controlled unit.

Figure 6:
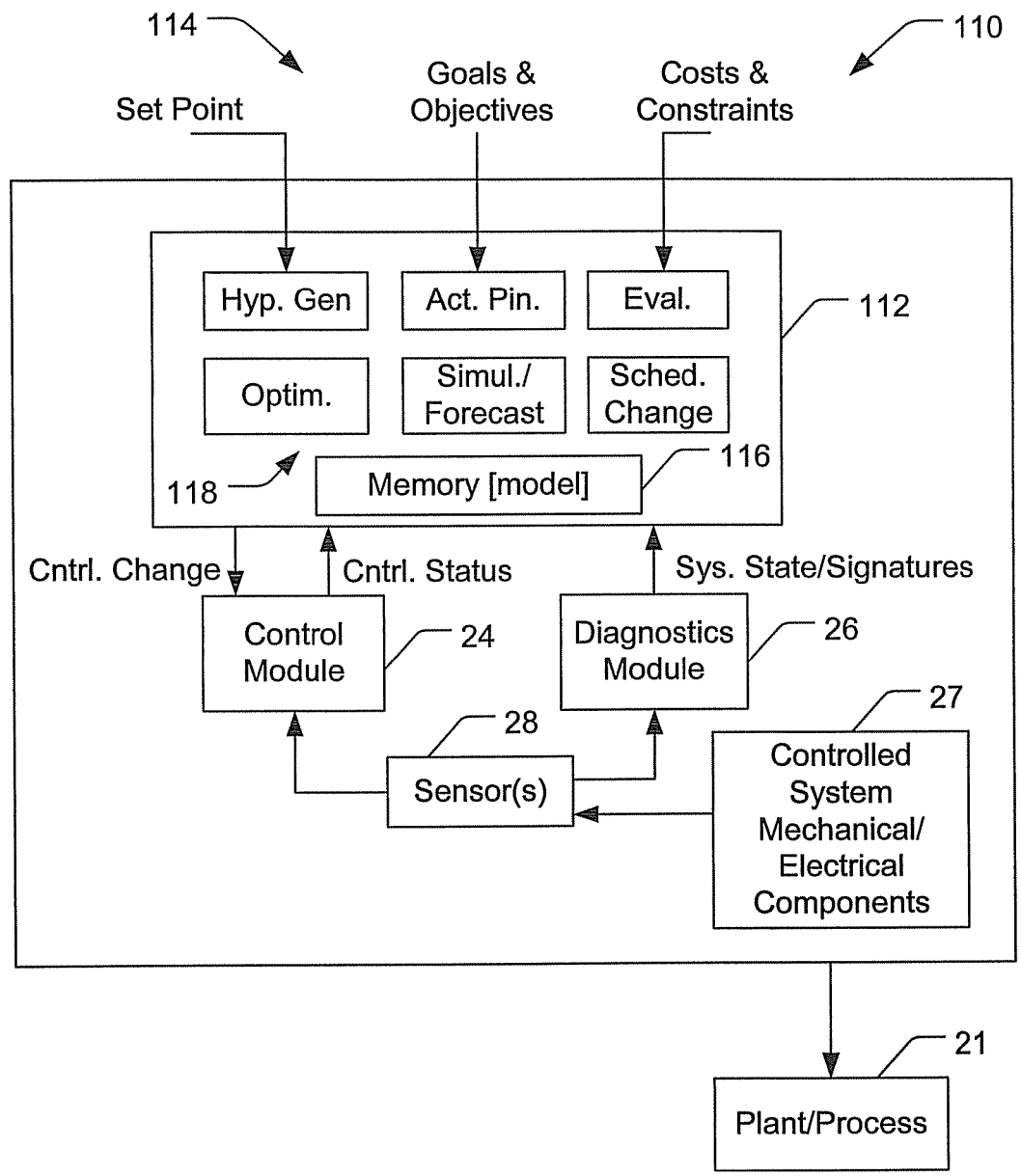
FIG. 6 is a generic block diagram showing an alternate embodiment of the present invention.

Turning to FIG. 6, an integrated control and diagnostics system 110 according to an alternate embodiment provides optimization of the control and diagnostics operations via a supervisory system 112. Similar to the preferred embodiment described above, system 110 includes control and diagnostics modules 24 and 26, respectively, that are integrated with each other and, for example, mounted within a controlled system 111. Preferably, module 24 and 26 comprise application specific integrated circuits (ASICs), however they can all be implemented in software. And, sensors 28 are coupled to mechanical and/or electrical components 27 of controlled system 111 to continuously monitor system operating parameters.

Supervisory system 112 provides centralized overall health assessment and operational optimization. Supervisory system 112 comprises a main processor that is integrated with control and diagnostics modules 24, 26, respectively, but it may comprise a separate unit. Supervisory system 112 includes a plurality of operator inputs 114, which may include a set point (e.g., a velocity), goals/objectives (e.g., running at 200% duty intermittently to minimize energy costs), and other miscellaneous constraints (e.g., minimum required motor speed, spare parts inventory, costs, etc.). Supervisory system 112 utilizes an adaptive model 116 associated with controlled unit 111, in conjunction with individual sub-modules 118 to optimize system operation. Sub-modules 118 may include an evaluation module, an action planning module, a hypothesis generation module, an optimization module, a simulation/forecasting module, a scheduled change module, etc. Each of sub-modules processes a particular set of data from both operator inputs 114 and system state information generated by diagnostics module 26 and controller status information from control module 24. Based on the processing performed by supervisory system 112, system 112 optimizes system operations by (1) modifying the output of control module 24 based on control recommendations output by diagnostics operations, and (2) making more accurate health assessments based on the control applied to the controlled unit, as described above.

The control electronics and diagnostics electronics of system 110 are integrated on a single logic board. Two ASICs are used for the integrated control/diagnostic board. The ASIC associated with control module 24 performs low level motor control functions, including generation of pulse-width-modulation (PWM) signals to switch the power electronics on the power converter board. The ASIC associated with diagnostics module 26 monitors multiple sensor inputs and performs signal processing, including scaling, filtering, and computation of Fast Fourier Transform (FFT) for raw sensor data. Both ASICs also contain "glue logic" for accessing the onboard A/D converter, MUX and memory (not shown). Glue logic is a means for modules 24 and 26 to utilize one set of sensors and to readily share common data. This may be done using shared memory, a common bus, and time and event synchronizing signals. Similar techniques will be used to allow asynchronous operation of the sub-modules in 112. The ASICs operate in conjunction with main processor 112. The ASICs function primarily to offload repetitive low-level computations from main processor 112, thereby freeing main processor 112 to focus on high-level pattern classification, optimization, and decision-making tasks. Main processor 112 receives post-processed data from the ASICs of the control and diagnostics modules 24 and 26, executes condition-based maintenance and integrated control/diagnostic algorithms, and modifies controller parameters as necessary. The ASICs are preferably implemented in Field Programmable Gate Arrays (FPGAs) to reduce development time and to accommodate design modifications (described above in conjunction with FIG. 3.)

Note that the controlled system of the preferred embodiments has been described for use with a motor; however, other types of controlled systems 20 contemplated for use with one preferred embodiments include ovens, hydraulic systems, internal combustion engines, complete vehicles, etc.

Figure 7:
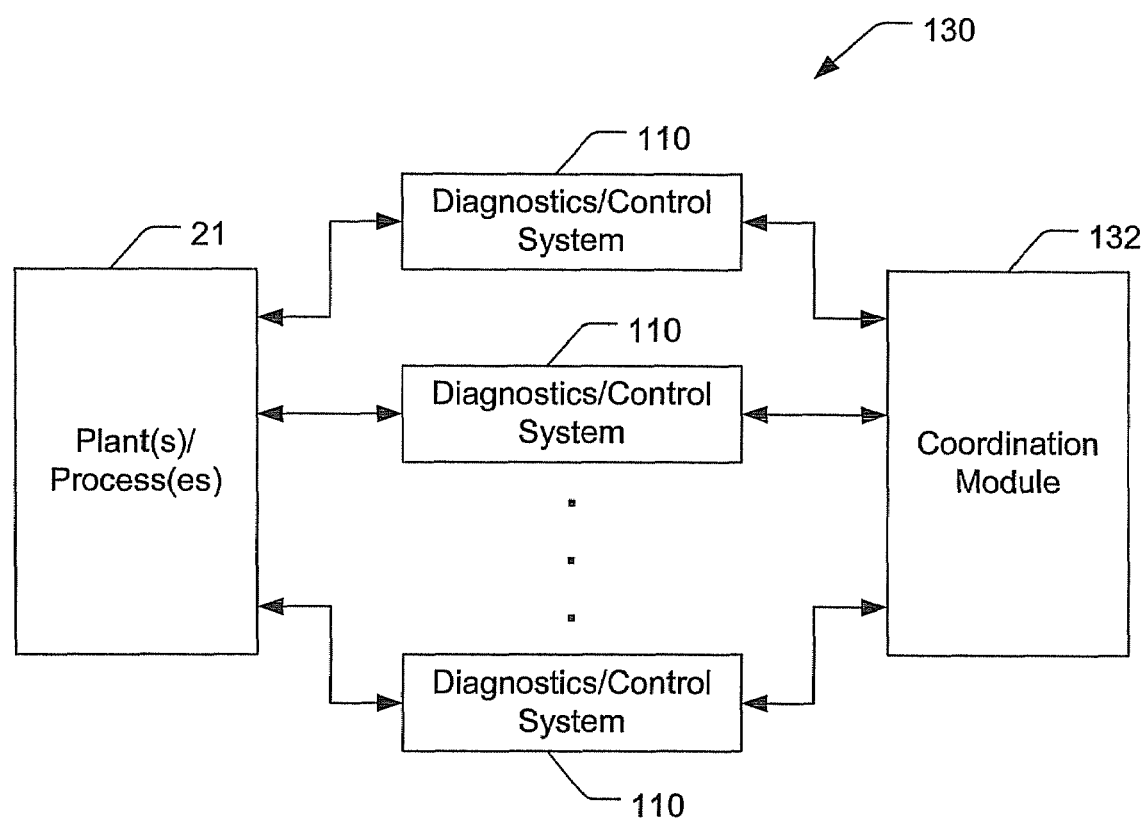
FIG. 7 is a block diagram showing n alternate configuration of a preferred embodiment of the present invention.

In addition, multiple ones of the systems of the preferred embodiments may be integrated to form a hierarchy of control and diagnostics. For example, as shown in FIG. 7, a system 130 includes a plurality of integrated control and diagnostics systems (e.g., system 110 in FIG. 6) that are electrically coupled to a coordination module 132. Module 132 is adapted to provide higher-level decision making to efficiently operate at least one plant or process 21. Coordinating the control and health assessment is preferably implemented with a system model executed by module 132. Module 132 functions to maximize the useful life of each controlled system by assessing the health and control provided for each system. As a result, system 130 operates to insure that changes in control associated with one controlled system do not adversely affect other controlled systems in the overall process line.

Overall, the integrated diagnostics and fault-tolerant control features of the preferred embodiment make an intelligent servo motor particularly suited for industrial manufacturing operations where reducing system installation time and avoiding unscheduled down time are critical to profitability. Similarly, the system of the preferred embodiments also improves combat readiness of electric actuators on military platforms. In particular, based on expected mission requirements, the diagnostics/prognostics module may determine if the equipment will survive the mission before committing the ship or military vehicle to the mission, thereby avoiding a potentially catastrophic event. The embedded condition-based maintenance software/models provides automated health monitoring of the motor and gear train, thus reducing the need for regular maintenance checks and servicing by technicians. The integration of motor control and diagnostics on a single platform opens the door to a new fault-tolerant control algorithm that can intelligently trade-off system performance to avert failure.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications. The scope of these changes will become apparent from the appended claims.

What is claimed is:

1. An integrated control and diagnostic system comprising:
    a diagnostic module to generate a diagnostic signal indicative of proper operation of a controlled system; and
    a control module integrated into the controlled system with the diagnostic module, wherein the control module generates a driving output for the controlled system based on a control optimization algorithm and the diagnostic signal;
    wherein the diagnostic signal is utilized to detect and diagnose developing faults before the system become inoperable and to alter the driving output by averting or accommodating the faults according to a model.

2. The system of claim 1, wherein the diagnostic module generates diagnostic signal based on the driving output.

3. The system of claim 1, wherein the control module is associated with at least one controllable parameter, the parameter being controllable in response to the diagnostic signal.

4. The system of claim 1, further comprising at least one sensor embedded into the controlled system to measure parameters associated with the controlled system.

5. The system of claim 4, wherein the parameters associated with the controlled system include at least one of speed, current, voltage, temperature, vibration, magnetic flux, and lubrication characteristics.

6. The system of claim 1, wherein the output is utilized to perform a system simulation.

7. The system of claim 1, wherein the diagnostic module is implemented with application specific integrated circuits.

8. The system of claim 1, wherein the control module includes a velocity feedback loop and a torque feedback loop.

9. The system of claim 1, wherein the control module includes a P-I controller.

10. The system of claim 9, wherein the control module includes an inverter.

11. A control and diagnostic system comprising:
    a diagnostic module to produce a diagnostic signal indicative of proper operation of a controlled system; and
    a processor to receive the health assessment signal from the diagnostic module, process the health assessment signal, and transmit the processed signal to a control module coupled to the diagnostic module and integrated into the controlled system, wherein the control module generates a driving output based at least in part on the processed signal;
    wherein the diagnostic signal is utilized to detect and diagnose developing faults before the system becomes inoperable and to alter the driving output by averting or accommodating the faults according to a model.

12. The system of claim 11, wherein the processor is integrated into the controlled system.

13. The system of claim 11, wherein the processor is integrated into the diagnostic module.

14. The system of claim 11, wherein the processed signal is indicative of changes the control module needs to make to optimize system operation.

15. The system of claim 14, wherein the processed signal is based on the driving output.

16. The system of claim 15, wherein the processed signal is based on at least one optimization parameter input to the processor via auxiliary inputs.

17. The system of claim 16, wherein the at least one optimization parameter relates to at least one of mission requirements, workload schedule, operating environment, and preventative maintenance schedules.

18. The system of claim 11, wherein the processor transmits the diagnostics signal to an external indicator unit.

19. The system of claim 11 wherein the processor transmits the diagnostics signal to an operator.

* * * * *